United States Patent [19]

Chen

[11] Patent Number: 5,031,947
[45] Date of Patent: Jul. 16, 1991

[54] VEHICULAR BUMPER ASSEMBLY WITH MULTIBUFFER CONSTRUCTION

[76] Inventor: Ming-Tang Chen, No. 23-4, Alley 21, Yong Xing Road, Dali, Taichung, Taiwan

[21] Appl. No.: 461,368

[22] Filed: Jan. 5, 1990

[51] Int. Cl.$^5$ .............................................. B60R 19/26
[52] U.S. Cl. ................................... 293/135; 293/121; 293/122; 293/132; 293/133; 293/137; 293/146; 267/139
[58] Field of Search ............... 293/120, 121, 122, 132, 293/133, 135, 137, 146; 267/116, 139

[56] References Cited

U.S. PATENT DOCUMENTS

| | | | |
|---|---|---|---|
| 1,293,224 | 2/1919 | Smith | 293/137 X |
| 1,458,276 | 6/1923 | Cox | 293/135 |
| 1,485,332 | 2/1924 | Edwards | 293/146 X |
| 1,538,804 | 5/1925 | Harris et al. | 293/137 X |
| 1,640,222 | 8/1927 | Slowik | 293/137 |
| 1,697,498 | 1/1929 | Fageol | 293/122 X |
| 1,741,513 | 12/1929 | Finizio | 293/135 X |
| 1,746,502 | 2/1930 | Sumi et al. | 293/121 X |
| 1,834,824 | 12/1931 | Brown | 293/135 X |
| 2,188,082 | 1/1940 | Imhofe | 293/121 |
| 2,531,967 | 11/1950 | Bishop | 293/120 |
| 2,883,714 | 4/1959 | May | 293/137 X |
| 3,173,717 | 3/1965 | Péras | 293/146 X |
| 3,226,146 | 12/1965 | Behr | 293/132 X |
| 3,326,590 | 6/1967 | Wilfert | 293/146 |
| 3,606,433 | 9/1971 | Kunevicius | 293/120 X |
| 3,756,643 | 9/1973 | Weed | 293/137 X |
| 3,797,874 | 3/1974 | Tufano | 293/137 X |
| 3,806,180 | 4/1974 | Patterson | 293/133 |
| 3,960,397 | 6/1976 | Janci | 293/137 X |
| 4,079,975 | 3/1978 | Matsuzaki et al. | 293/132 |
| 4,088,357 | 5/1978 | Klie et al. | 293/122 |
| 4,652,032 | 3/1987 | Smith | 293/120 |
| 4,807,915 | 2/1989 | Shyi | 267/139 X |

FOREIGN PATENT DOCUMENTS 685224  3/1965  Italy .................................... 293/137

Primary Examiner—Margaret A. Focarino
Assistant Examiner—Andrew C. Pike
Attorney, Agent, or Firm—Ostrolenk, Faber, Gerb & Soffen

[57] ABSTRACT

A vehicular bumper assembly is formed of an outer bumper with one or more arcuate faces and one or more resilient pipes having outer surfaces conforming to the arcuate faces. The pipes are located adjacent to the faces and serve a buffering function when the outer bumper moves rearwardly in a collision. A buffer spring assembly absorbs an initial first portion of a collision force. The pipes then absorb a second portion of the collision force. The assembly also has a touch switch for enabling the vehicle's horn during a collision.

6 Claims, 3 Drawing Sheets

VEHICULAR BUMPER ASSEMBLY WITH MULTIBUFFER CONSTRUCTION

FIELD OF THE INVENTION

The present invention relates to a vehicular bumper assembly, particularly to one which has a multi-buffer structure that will provide the vehicle, driver and passengers with greater protection against accidental collision.

BACKGROUND OF THE INVENTION

Conventional bumpers located at the front and rear ends of a vehicle are generally too weak and serve primarily a decorative rather than a protective function. While these bumpers will absorb minor forces before the vehicle is damaged, they cannot protect the vehicle and its occupants from severe injury when an accidental collision of strong force occurs. A bumper which will provide significantly better protection is needed.

OBJECTS OF THE INVENTION

The primary object of the present invention is to improve the above-said shortcoming of conventional bumpers by providing a multi-buffered vehicular bumper which preferably has the following features:

1. Upon its initial contact with an object, the invention emits horn sounds to warn the passenger of the collision and to absorb any slight striking force which does not exceed the limit of its buffer springs.

2. If the striking force surpasses the limit of the buffer springs, resilient steel pipes located behind the outer bumper will absorb such forces so as to lessen the chances of any possible damage to the vehicle and its occupants.

SUMMARY OF THE INVENTION

The present invention relates to a vehicular bumper assembly which is formed of an outer bumper with an elongated shell. The bumper is mounted to a vehicle and permitted to move resiliently rearwardly from a forwardmost position to a rearwardmost position when a rearward collision force is applied thereto. A first portion of the collision force is absorbed by the means for resiliently mounting the bumper. The assembly further includes at least one elongated pipe which is fixedly supported with respect to the vehicle. The pipe is generally parallel to the shell and is rearwardly spaced apart from an arcuate face of the shell. The bumper assembly is arranged such that as the outer bumper moves to the rearwardmost position, the pipe is deformed by the bumper and thereby absorbs a second portion of the collision force.

Preferably, the vehicular bumper assembly further includes audible warning means for generating an audible warning whenever the outer bumper moves rearwardly a predetermined distance.

DETAILED DESCRIPTION OF THE PREFERRED EMBODIMENTS

Figure 1:
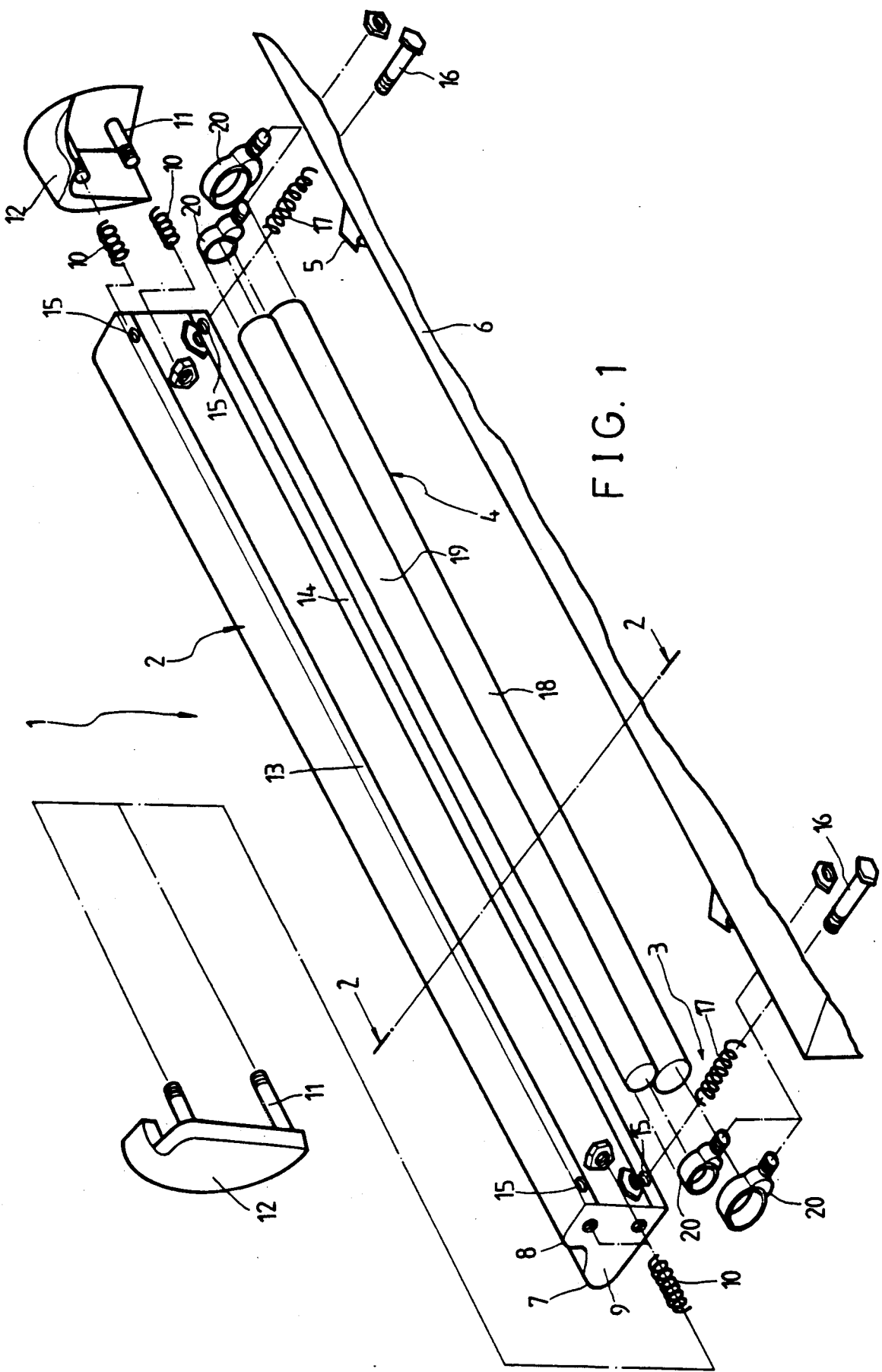
FIG. 1 is an exploded view of a preferred embodiment of the invention.
Figure 2:
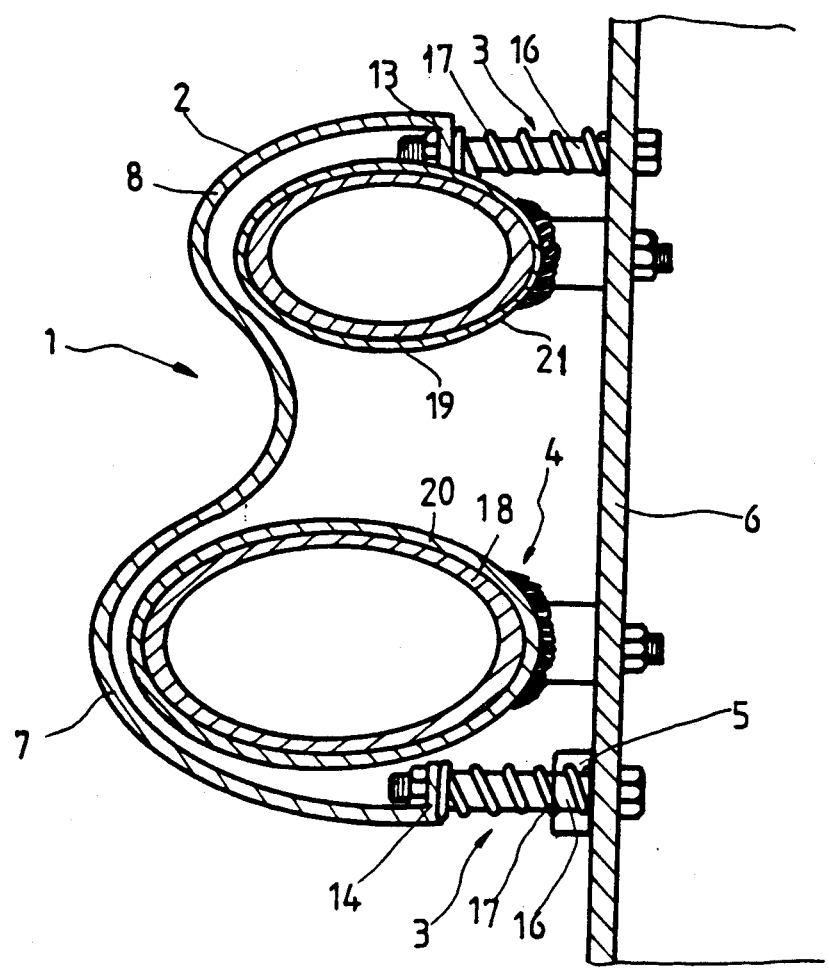
FIG. 2 is a sectional view, in non-exploded form, taken along line 2—2 of FIG. 1.
Figure 3:
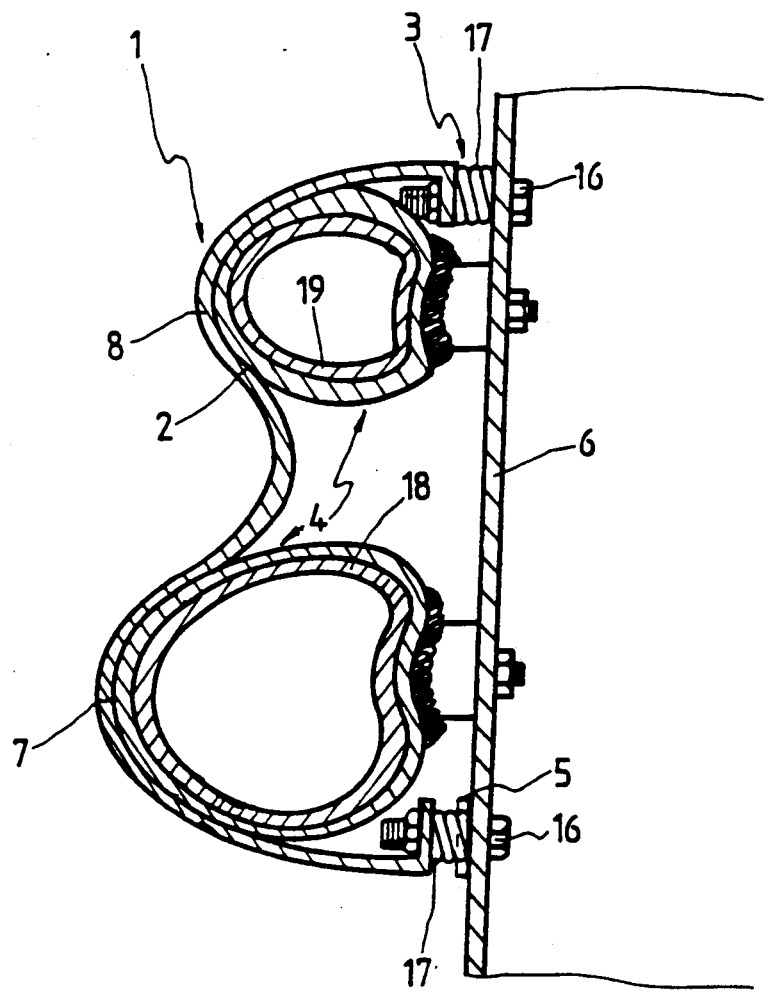
FIG. 3 shows how the invention absorbs a collision force.

Referring to FIGS. 1 and 2, the inventive vehicular bumper assembly 1 comprises an arcuately shaped outer bumper 2, a buffer spring assembly 3, a resilient pipe assembly 4 and a touch switch 5 which can enable the vehicle's horn circuits to sound the horn as a warning to the passengers. Outer bumper 2, shaped with one or more extending arcuate faces 7, 8 in the form of an elongated shell, is connected at opposite ends thereof with end plates 9. End plates 9 are coupled to respective end closures 12 by springs 10 and studs 11. The outer bumper 2 has an open back side wherein its upper and lower plates turn 90° in a direction toward the mid area thereof to create two strips of connection bases 13, 14 having connection holes 15 for slide bars 16 of buffer spring assembly 3 to make connection thereby. Buffer spring assembly 3 includes two or more pairs of slide bars 16, each carrying a respective cylindric compression spring 17. Each slide bar 16 may be a large screw bolt which is sleeved with a compression spring 17. The slide bar 16 may be screwed to outer bumper 2 via hole 15 and to crossmember 6 of the vehicle frame's front and rear ends to serve as the initial buffering mechanism of bumper assembly 1 against collision. Resilient pipe assembly 4 (FIG. 2) is composed of resilient steel pipes 18, 19 and fixing hoops 20, 21 that correspond in size and shape to the pipes 18, 19. Pipes 18, 19 are preferably elliptic (other shapes such as a square shape can be used) to adapt to the curve of the arcuate faces 7, 8 of the outer bumper 2 and have proper resilience and are held firmly by fixing hoops 20, 21 which are connected to the crossmember 6 of the vehicle frame's front and rear ends. The fronts of the pipes 18, 19 are spaced a suitable distance from arcuate faces 7, 8, respectively. Touch switch 5 (FIG. 1) is a reed switch which is connected to crossmember 6 at a suitable place adjacent to the connection base 13 or 14 of outer bumper 2, so that when outer bumper 2 is moved rearwardly, touch switch 5 will be affected just during the initial collision to emit horn sounds to warn the driver of the collision.

If outer bumper 2 collides with something such that spring 17 is compressed, then touch switch 5 will be closed and horn sounds will be emitted to warn the driver to start braking immediately. If the force of the collision exceeds the limits of the compression springs, the faces 7, 8 will be forced into contact with resilient steel pipes 18, 19 to cause the pipes 18, 19 to deform and absorb the force of the collision. With the vehicular bumper assembly 1, both the vehicle and persons could be given more safety protection and suffer the least possible damage in an accidental collision.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A vehicular bumper assembly comprising:
   an outer bumper with an elongated shell, said shell having an arcuate face;
   spring means for mounting said outer bumper to a vehicle and for permitting said bumper to move resiliently rearwardly from a forwardmost position to a rearwardmost position when a rearward collision force is applied externally to said bumper, said bumper being located at said forwardmost position when no external force is applied thereto, said spring means absorbing a first portion of said collision force as said bumper moves rearwardly from said forwardmost position;

an elongated pipe and means for fixedly supporting said pipe with respect to said vehicle, said pipe being generally parallel to said shell and being rearwardly spaced apart from said arcuate face of said shell, said bumper assembly being arranged such that, as said outer bumper moves rearwardly to said rearwardmost position, said pipe is deformed by said bumper and thereby absorbs a second portion of said collision force; and audible warning means for generating an audible warning whenever said outer bumper moves rearwardly a predetermined distance.

2. The vehicular bumper assembly of claim 1, wherein said warning means comprises:

a horn; and switch means for enabling said horn whenever said outer bumper moves rearwardly said predetermined distance.

3. A vehicular bumper assembly comprising:

an outer bumper with an elongated shell, said shell having first and second arcuate faces;

spring means for mounting said outer bumper to a vehicle and for permitting said bumper to move resiliently rearwardly from a forwardmost position to a rearwardmost position when a rearward collision force is applied externally to said bumper, said bumper being located at said forwardmost position when no force is applied thereto, said spring means absorbing a first portion of said collision force as said bumper moves rearwardly from said forwardmost position;

first and second elongated pipes, and means for fixedly supporting said first and second pipes with respect to said vehicle, said pipes being generally parallel to said arcuate faces of said shell and being rearwardly spaced apart from said arcuate faces, said bumper assembly being arranged such that, as said outer bumper moves rearwardly to said rearwardmost position, said pipes are deformed and thereby absorb a second portion of said collision force.

4. A vehicular bumper assembly in accordance with claim 3, wherein said pipes are elliptical in cross section.

5. A vehicular bumper assembly in accordance with claim 3, further including warning means for emitting an audible warning when said outer bumper moves rearwardly a predetermined distance.

6. A vehicular bumper assembly comprising:

an outer bumper which includes an elongated shell, opposite end plates, upper and lower connection strips and a rear opening, the shell including first and second arcuate faces, the upper and lower connection strips being turned 90° toward each other, each of the strips having connection holes formed therein, the rear opening being located between the connection strips;

end closures, springs and studs, the end closures being connected to the end plates of the outer bumper by the springs and studs;

a buffer spring assembly which includes two pairs of buffer springs, each of the buffer springs including a slide bar and a cylindric compression spring located thereon, each of the slide bars being a large screw bolt, each of the screw bolts extending through one of the connection holes and being coupled to one of the connection strips by a mating nut, the outer bumper and the spring assembly cooperating to function as an initial buffer for the vehicular bumper assembly;

a resilient pipe assembly which includes first and second pipes and first and second fixing hoops, the pipes being located near but spaced apart from the arcuate faces of the shell, the pipes being parallel to the arcuate faces, the pipes being held in place by the fixing hoops; and a reed switch which is adjacent to one of the connection strips, the reed switch moving into an open position or a closed position when the outer bumper is moved a predetermined distance in response to a collision.

* * * * *